(12) United States Patent  
Nakane et al.

(10) Patent No.: US 11,921,852 B2  
(45) Date of Patent: Mar. 5, 2024

(54) INSTRUCTION OUTPUT APPARATUS, INSTRUCTION OUTPUT METHOD AND PROGRAM

(71) Applicant: NIPPON TELEGRAPH AND TELEPHONE CORPORATION, Tokyo (JP)

(72) Inventors: Ai Nakane, Tokyo (JP); Asuka Ono, Tokyo (JP); Toshihide Saito, Tokyo (JP); Asuka Miyake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 281 days.

(21) Appl. No.: 17/614,216

(22) PCT Filed: May 27, 2019

(86) PCT No.: PCT/JP2019/020819  
§ 371 (c)(1),  
(2) Date: Nov. 24, 2021

(87) PCT Pub. No.: WO2020/240641  
PCT Pub. Date: Dec. 3, 2020

(65) Prior Publication Data  
US 2022/0261479 A1    Aug. 18, 2022

(51) Int. Cl.  
*G06F 21/55*    (2013.01)

(52) U.S. Cl.  
CPC ...... *G06F 21/554* (2013.01); *G06F 2221/034* (2013.01)

(58) Field of Classification Search  
None  
See application file for complete search history.

(56) References Cited

U.S. PATENT DOCUMENTS

2013/0086641 A1* 4/2013 Mehr ..................... G06F 21/40  
726/4  
2020/0125725 A1* 4/2020 Petersen ............... H04L 43/065

FOREIGN PATENT DOCUMENTS

| JP | 2017220720 A | 12/2017 |
| JP | 201805607 A  | 1/2018  |
| JP | 2019021161 A | 2/2019  |
| JP | 2019046207 A | 3/2019  |

* cited by examiner

*Primary Examiner* — Cai Y Chen

(57) ABSTRACT

An instruction output device facilitates coping with risks on security by including a first acquisition unit for acquiring, in response to input of risk information indicating contents of a risk related to security of an information processing terminal, one or more instructions corresponding to the risk information; a second acquisition unit for acquiring, for each of the instructions acquired by the first acquisition unit, a message indicating contents of the instruction corresponding to a security-related skill level of a user of the information processing terminal; and an output unit for outputting the message acquired by the second acquisition unit to the user.

18 Claims, 13 Drawing Sheets

Fig. 5

| RISK ID | RISK INFORMATION |
|---|---|
| A | YOU ARE ACCESSING PHISHING SITE |
| B | YOU ARE ACCESSING WEBSITE INCLUDING MALICIOUS PROGRAM |
| C | YOU HAVE RECEIVED VIRUS ATTACHED E-MAIL |
| D | PC IS INFECTED WITH VIRUS |
| E | USER'S PC IS PERFORMING DOS ATTACK |
| F | USER'S PC IS REMOTELY CONTROLLED |

Fig. 6

| CONTACT CLASSIFI-CATION | CONTACT INFORMATION | MESSAGE PREAMBLE | MESSAGE 1 | MESSAGE 2 | MESSAGE 3 | MESSAGE 4 | ... | MESSAGE n |
|---|---|---|---|---|---|---|---|---|
| USER/ TELE-PHONE | 0x0-xxxx-xxxx | PERSONAL COMPUTER IS USED FOR ATTACK (CRIME) ON ANOTHER PERSONAL COMPUTER, ETC. | "PLEASE DISCONNECT FROM NETWORK" | — | — | — | — | — |
| USER/ E-MAIL | xxxx.xxx@xx.jp | PERSONAL COMPUTER IS USED FOR ATTACK (CRIME) ON ANOTHER PERSONAL COMPUTER, ETC. | — | "PLEASE USE ANTIVIRUS SOFTWARE, ETC. TO SCAN ALL FILES FOR VIRUS, ETC. ON TERMINAL" | "PLEASE CHECK TYPE OF FOUND VIRUS BASED ON THREAT DB, ETC. AND CHECK REMOVAL METHOD" | "PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)" | — | — |
| SUP-PORTER/ TELE-PHONE | 0x0-xxxx-xxxx | PERSONAL COMPUTER IS USED FOR ATTACK (CRIME) ON ANOTHER PERSONAL COMPUTER, ETC. | — | — | — | — | — | — |
| SUP-PORTER/ E-MAIL | xxxxxx@xx.jp | PERSONAL COMPUTER IS USED FOR ATTACK (CRIME) ON ANOTHER PERSONAL COMPUTER, ETC. | — | "PLEASE USE ANTIVIRUS SOFTWARE, ETC. TO SCAN ALL FILES FOR VIRUS, ETC. ON TERMINAL" | "PLEASE CHECK TYPE OF FOUND VIRUS BASED ON THREAT DB, ETC. AND CHECK REMOVAL METHOD" | "PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)" | — | — |

Fig. 7

| USER ID | SKILL LEVEL (FIVE RANKS) | CONTACT INFORMATION OF USER | | CONTACT INFORMATION OF SUPPORTER | |
|---|---|---|---|---|---|
| | | TELEPHONE | E-MAIL | TELEPHONE | E-MAIL |
| 001 | 3 | 0X0-XXXX-XXXX | xxxxxxxx.xxx@xx.jp | 0X0-XXXX-XXXX | xxxxxxxx.xxx@xx.jp |

Fig. 8

| RISK ID | INSTRUCTION 1 | INSTRUCTION 2 | INSTRUCTION 3 | INSTRUCTION 4 | INSTRUCTION 5 |
|---|---|---|---|---|---|
| A | STOP INPUTTING INFORMATION | CHANGE AND CHECK INPUT INFORMATION (ID, PW AND CARD INFORMATION, ETC.) | - | - | - |
| B | STOP ACCESSING SITE | DISCONNECT FROM NETWORK | SCAN TERMINAL | CHECK TYPE OF VIRUS AND CHECK REMOVAL METHOD | REMOVE VIRUS |
| C | DELETE OR ISOLATE E-MAIL | SCAN TERMINAL | - | - | - |
| D | DISCONNECT FROM NETWORK | CHECK NETWORK SERVICE AND CREDIT CARD USAGE, AND TAKE NECESSARY ACTION | SCAN TERMINAL | CHECK TYPE OF VIRUS AND CHECK REMOVAL METHOD | IF VIRUS IS FOUND, REMOVE IT |
| E | DISCONNECT FROM NETWORK | SCAN TERMINAL | CHECK TYPE OF VIRUS AND CHECK REMOVAL METHOD | IF VIRUS IS FOUND, REMOVE IT | - |
| F | DISCONNECT FROM NETWORK | CHECK NETWORK SERVICE AND CREDIT CARD USAGE, AND TAKE NECESSARY ACTION | SCAN TERMINAL | CHECK TYPE OF VIRUS AND CHECK REMOVAL METHOD | IF VIRUS IS FOUND, REMOVE IT |

Fig. 9

| INSTRUCTION 1 | INSTRUCTION 2 | INSTRUCTION 3 | INSTRUCTION 4 |
|---|---|---|---|
| DISCONNECT FROM NETWORK | SCAN TERMINAL | CHECK TYPE OF VIRUS AND CHECK REMOVAL METHOD | IF VIRUS IS FOUND, REMOVE IT |

Fig. 10

| RISK ID | SKILL LEVEL 5 | SKILL LEVEL 4 | SKILL LEVEL 3 | SKILL LEVEL 2 | SKILL LEVEL 1 |
|---|---|---|---|---|---|
| A | YOU ARE ACCESSING PHISHING SITE | YOU ARE ACCESSING PHISHING SITE | YOU ARE ACCESSING PHISHING SITE | YOU ARE ACCESSING MALICIOUS SITE WHICH EXTRACTS INFORMATION | YOU ARE ACCESSING MALICIOUS SITE WHICH EXTRACTS INFORMATION |
| B | YOU ARE ACCESSING WEBSITE INCLUDING MALICIOUS PROGRAM | YOU ARE ACCESSING WEBSITE INCLUDING MALICIOUS PROGRAM | YOU ARE ACCESSING WEBSITE INCLUDING MALICIOUS PROGRAM | YOU ARE ACCESSING WEBSITE WHICH MAY CAUSE PERSONAL COMPUTER TO BECOME INFECTED WITH MALIGNANT VIRUS AND SO ON | YOU ARE ACCESSING WEBSITE WHICH MAY CAUSE PERSONAL COMPUTER TO BECOME INFECTED WITH MALIGNANT VIRUS AND SO ON |
| C | YOU HAVE RECEIVED VIRUS ATTACHED E-MAIL | YOU HAVE RECEIVED VIRUS ATTACHED E-MAIL | YOU HAVE RECEIVED VIRUS ATTACHED E-MAIL | YOU HAVE RECEIVED VIRUS ATTACHED E-MAIL | VIRUS WHICH MAY ADVERSELY AFFECT PERSONAL COMPUTER IS INCLUDED IN RECEIVED E-MAIL |
| D | PERSONAL COMPUTER IS INFECTED WITH VIRUS | PERSONAL COMPUTER IS INFECTED WITH VIRUS | PERSONAL COMPUTER IS INFECTED WITH VIRUS | PERSONAL COMPUTER IS INFECTED WITH VIRUS | PERSONAL COMPUTER IS INFECTED WITH VIRUS. IT IS VERY DANGEROUS BECAUSE INFORMATION MAY BE LEAKED OR PERSONAL COMPUTER MAY BE HIJACKED |
| E | PERSONAL COMPUTER IS USED FOR DOS ATTACK | PERSONAL COMPUTER IS USED FOR DOS ATTACK | PERSONAL COMPUTER IS USED FOR ATTACK (CRIME) ON ANOTHER PERSONAL COMPUTER, ETC. | PERSONAL COMPUTER IS USED FOR ATTACK (CRIME) ON ANOTHER PERSONAL COMPUTER, ETC. | PERSONAL COMPUTER IS USED FOR ATTACK (CRIME) ON ANOTHER PERSONAL COMPUTER, ETC. |
| F | PERSONAL COMPUTER IS REMOTELY CONTROLLED | PERSONAL COMPUTER IS REMOTELY CONTROLLED | PERSONAL COMPUTER IS REMOTELY CONTROLLED. VARIOUS INFORMATION STORED ON PERSONAL COMPUTER (PASSWORDS OF FILE AND SERVICE, INFORMATION OF CREDIT CARD, ETC.) MAY BE STOLEN OR USED FOR ATTACK (CRIME) ON ANOTHER PERSONAL COMPUTER, ETC. | PERSONAL COMPUTER IS REMOTELY CONTROLLED. VARIOUS INFORMATION STORED ON PERSONAL COMPUTER (PASSWORDS OF FILE AND SERVICE, INFORMATION OF CREDIT CARD, ETC.) MAY BE STOLEN OR USED FOR ATTACK (CRIME) ON ANOTHER PERSONAL COMPUTER, ETC. | PERSONAL COMPUTER IS REMOTELY CONTROLLED. VARIOUS INFORMATION STORED ON PERSONAL COMPUTER (PASSWORDS OF FILE AND SERVICE, INFORMATION OF CREDIT CARD, ETC.) MAY BE STOLEN OR USED FOR ATTACK (CRIME) ON ANOTHER PERSONAL COMPUTER, ETC. |

Fig. 11

| INSTRUCTION | CONTACT MEANS | SKILL LEVEL 5 | SKILL LEVEL 4 | SKILL LEVEL 3 | SKILL LEVEL 2 | SKILL LEVEL 1 |
|---|---|---|---|---|---|---|
| STOP INPUTTING INFORMATION | TELEPHONE | USER | USER | USER | USER/ SUPPORTER | USER/ SUPPORTER |
| CHANGE AND CHECK INPUT INFORMATION (ID, PW AND CARD INFORMATION, ETC.) | TELEPHONE | USER | USER | USER | USER/ SUPPORTER | USER/ SUPPORTER |
| STOP ACCESSING SITE | TELEPHONE | USER | USER | USER | USER/ SUPPORTER | USER/ SUPPORTER |
| DISCONNECT FROM NETWORK | TELEPHONE | USER | USER | USER | USER/ SUPPORTER | USER/ SUPPORTER |
| SCAN TERMINAL | E-MAIL | USER | USER | USER/ SUPPORTER | USER/ SUPPORTER | USER/ SUPPORTER |
| REMOVE VIRUS | E-MAIL | USER | USER | USER/ SUPPORTER | USER/ SUPPORTER | USER/ SUPPORTER |
| DELETE OR ISOLATE E-MAIL | E-MAIL | USER | USER | USER/ SUPPORTER | USER/ SUPPORTER | USER/ SUPPORTER |
| CHECK TYPE OF VIRUS AND CHECK REMOVAL METHOD | E-MAIL | USER | USER/ SUPPORTER | USER/ SUPPORTER | USER/ SUPPORTER | USER/ SUPPORTER |
| CHECK NETWORK SERVICE AND CREDIT CARD USAGE, AND TAKE NECESSARY ACTION | E-MAIL | USER | USER | USER | USER/ SUPPORTER | USER/ SUPPORTER |

Fig. 12

| INSTRUCTION | SKILL LEVEL 5 | SKILL LEVEL 4 | SKILL LEVEL 3 | SKILL LEVEL 2 | SKILL LEVEL 1 |
|---|---|---|---|---|---|
| STOP INPUTTING INFORMATION | "PLEASE STOP INPUTTING INFORMATION" | "PLEASE STOP INPUTTING INFORMATION" | "PLEASE STOP INPUTTING INFORMATION" | "PLEASE STOP INPUTTING INFORMATION" | "PLEASE DON'T INPUT TEXT OR PRESS BUTTONS ON SITE. PLEASE CLOSE SITE" |
| CHANGE AND CHECK INPUT INFORMATION (ID, PW AND CARD INFORMATION, ETC.) | "PLEASE CHANGE INPUT PW" "PLEASE STOP CREDIT CARD" | "PLEASE CHANGE INPUT PW" "PLEASE STOP CREDIT CARD" | "PLEASE CHANGE INPUT PW" "PLEASE STOP CREDIT CARD" | "INPUT INFORMATION MAY BE ABUSED. PLEASE SEARCH FOR SERVICE NAME IN FAVORITES OR SEARCH SITE AND CHANGE PW FROM THERE" "CREDIT CARD MAY BE ABUSED. PLEASE CONTACT CREDIT CARD COMPANY AND STOP CARD" | "INPUT INFORMATION MAY BE ABUSED. PLEASE SEARCH FOR SERVICE NAME IN FAVORITES OR SEARCH SITE AND CHANGE PW FROM THERE" "CREDIT CARD MAY BE ABUSED. PLEASE CONTACT CREDIT CARD COMPANY AND STOP CARD" |
| STOP ACCESSING SITE | "PLEASE STOP ACCESSING SITE" | "PLEASE STOP ACCESSING SITE" | "PLEASE STOP ACCESSING SITE" | "PC MAY BE INFECTED WITH VIRUS. PLEASE CLOSE SITE" | "PC MAY BE INFECTED WITH VIRUS. PLEASE CLOSE SITE" |
| DISCONNECT FROM NETWORK | "PLEASE DISCONNECT FROM NETWORK" | "PLEASE DISCONNECT FROM NETWORK" | "PLEASE DISCONNECT FROM NETWORK" | "IF PERSONAL COMPUTER IS CONNECTED TO INTERNET BY INSERTING LAN CABLE, PLEASE DISCONNECT LAN CABLE FROM PERSONAL COMPUTER. OTHERWISE, PLEASE TURN OFF WIFI" | "IF PERSONAL COMPUTER IS CONNECTED TO INTERNET BY INSERTING LAN CABLE, PLEASE DISCONNECT LAN CABLE FROM PERSONAL COMPUTER. OTHERWISE, PLEASE TURN OFF WIFI" |
| SCAN TERMINAL | "PLEASE SCAN TERMINAL" | "PLEASE SCAN TERMINAL" | "PLEASE USE ANTIVIRUS SOFTWARE, ETC. TO SCAN ALL FILES FOR VIRUS, ETC. ON TERMINAL" | "PLEASE USE ANTIVIRUS SOFTWARE TO SCAN ALL FILES FOR VIRUS, ETC. ON TERMINAL" | "PLEASE USE ANTIVIRUS SOFTWARE TO SCAN ALL FILES FOR VIRUS, ETC. ON TERMINAL" |
| REMOVE VIRUS | "PLEASE REMOVE FOUND VIRUS AND COMPLETELY REMOVE CAUSE OF INFECTION" | "PLEASE REMOVE FOUND VIRUS AND COMPLETELY REMOVE CAUSE OF INFECTION" | "PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)" | "PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)" | "PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)" |
| DELETE OR ISOLATE E-MAIL | "PLEASE COMPLETELY DELETE E-MAIL" | "PLEASE COMPLETELY DELETE E-MAIL" | "PLEASE DELETE E-MAIL. PLEASE COMPLETELY DELETE E-MAIL FROM TRASH BOX AS WELL." | "PLEASE DELETE E-MAIL. PLEASE COMPLETELY DELETE E-MAIL FROM TRASH BOX AS WELL." | "PLEASE DELETE E-MAIL. PLEASE COMPLETELY DELETE E-MAIL FROM TRASH BOX AS WELL." |
| CHECK TYPE OF VIRUS AND CHECK REMOVAL METHOD | "PLEASE CHECK TYPE OF FOUND VIRUS AND CHECK REMOVAL METHOD" | "PLEASE CHECK TYPE OF FOUND VIRUS BASED ON THREAT DB, ETC. AND CHECK REMOVAL METHOD" | "PLEASE CHECK TYPE OF FOUND VIRUS BASED ON THREAT DB, ETC. AND CHECK REMOVAL METHOD" | "PLEASE CHECK TYPE OF FOUND VIRUS BASED ON THREAT DB, ETC. AND CHECK REMOVAL METHOD" | "PLEASE CHECK TYPE OF FOUND VIRUS BASED ON THREAT DB, ETC. AND CHECK REMOVAL METHOD" |
| CHECK NETWORK SERVICE AND CREDIT CARD USAGE, AND TAKE NECESSARY ACTION | "PLEASE CHECK SERVICE INFORMATION AND CREDIT CARD USAGE INFORMATION, ETC." | "PLEASE CHECK SERVICE INFORMATION AND CREDIT CARD USAGE INFORMATION, ETC." | "PLEASE CHECK SERVICE INFORMATION AND CREDIT CARD USAGE INFORMATION, ETC." | "PASSWORD INFORMATION OR CREDIT CARD INFORMATION, ETC. MAY HAVE BEEN STOLEN. PLEASE CHECK IF SERVICE IS USED BY SOMEONE OTHER THAN YOU AND IF CREDIT CARD IS ABUSED. IF SO, PLEASE TAKE ACTION SUCH AS CHANGING PW OR STOPPING CARD." | "PASSWORD INFORMATION OR CREDIT CARD INFORMATION, ETC. MAY HAVE BEEN STOLEN. PLEASE CHECK IF SERVICE IS USED BY SOMEONE OTHER THAN YOU AND IF CREDIT CARD IS ABUSED. IF SO, PLEASE TAKE ACTION SUCH AS CHANGING PW OR STOPPING CARD." |

Fig. 13

(1) MESSAGE FOR "USER/TELEPHONE" (VOICE)

- "PERSONAL COMPUTER IS USED FOR ATTACK (CRIME) ON ANOTHER PERSONAL COMPUTER, ETC. PLEASE DISCONNECT FROM NETWORK"

(2) MESSAGE FOR "USER/E-MAIL" (TEXT)

- "PERSONAL COMPUTER IS USED FOR ATTACK (CRIME) ON ANOTHER PERSONAL COMPUTER, ETC. PLEASE USE ANTIVIRUS SOFTWARE, ETC. TO SCAN ALL FILES FOR VIRUS, ETC. ON TERMINAL. PLEASE CHECK TYPE OF FOUND VIRUS BASED ON THREAT DB, ETC. AND CHECK REMOVAL METHOD. PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)

(3) MESSAGE FOR "SUPPORTER/TELEPHONE" (VOICE)

- (NO MESSAGE IS TRANSMITTED)

(4) MESSAGE FOR "SUPPORTER/E-MAIL"

- "PERSONAL COMPUTER IS USED FOR ATTACK (CRIME) ON ANOTHER PERSONAL COMPUTER, ETC. PLEASE USE ANTIVIRUS SOFTWARE, ETC. TO SCAN ALL FILES FOR VIRUS, ETC. ON TERMINAL. PLEASE CHECK TYPE OF FOUND VIRUS BASED ON THREAT DB, ETC. AND CHECK REMOVAL METHOD. PLEASE REMOVE VIRUS BASED ON CHECKED REMOVAL METHOD. (PLEASE USE ANTIVIRUS SOFTWARE, ETC. TO REMOVE FOUND VIRUS. IN ADDITION, PLEASE DELETE E-MAIL OR FILE WHICH CAUSED INFECTION AND DELETE IT FROM TRASH BOX AS WELL.)

INSTRUCTION OUTPUT APPARATUS, INSTRUCTION OUTPUT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/020819, filed on 27 May 2019, the disclosure of which is hereby incorporated herein by reference in its entirety.

TECHNICAL FIELD

The present invention relates to an instruction output device, an instruction output method and a program.

BACKGROUND ART

When a problem (risk) on network security arises, a user needs to take action to avoid it in some way.

There has been a method of controlling timing of notification based on a usage situation of a terminal of a user. This makes it possible for the user to notice the notification from the terminal and facilitate action for avoiding the problem on security.

CITATION LIST

Patent Literature

Patent Literature 1: Japanese Patent Laid-Open No. 2017-220720

SUMMARY OF THE INVENTION

Technical Problem

However, the above-described method can prompt action by notification but cannot ensure that all users can take appropriate action to avoid security problems regardless of their IT levels.

For example, if a personal computer being used is infected with a virus, users with high IT skills can take action only by being instructed "Please isolate your PC from the network. Perform a full scan of your PC to remove the virus.", but users with low IT skills cannot understand specific action items even if they receive the instructions as described above and there is a possibility that their actions will be taken later.

The present invention has been made in view of the above-described points and aims to facilitate coping with risks on security.

Means for Solving the Problem

In order to solve the above-described problem, an instruction output device includes a first acquisition unit for acquiring, in response to input of risk information indicating contents of a risk related to security of an information processing terminal, one or more instructions corresponding to the risk information; a second acquisition unit for acquiring, for each of the instructions acquired by the first acquisition unit, a message indicating contents of the instruction corresponding to a security-related skill level of a user of the information processing terminal; and an output unit for outputting the message acquired by the second acquisition unit to the user.

Effects of the Invention

It is possible to facilitate coping with risks on security.

BRIEF DESCRIPTION OF DRAWINGS

FIG. 5 is a diagram showing an example of risk information.

FIG. 6 is a diagram showing a configuration example of one message data.

FIG. 7 is a diagram showing a configuration example of a user information DB 121.

FIG. 8 is a diagram showing a configuration example of an instruction DB 122.

FIG. 9 is a diagram showing an example of an instruction list.

FIG. 10 is a diagram showing a configuration example of a preamble DB 123.

FIG. 11 is a diagram showing a configuration example of a contact DB 124.

FIG. 12 is a diagram showing a configuration example of a message DB 125.

FIG. 13 is a diagram for describing an output example of a message.

DESCRIPTION OF EMBODIMENTS

Figure 1:
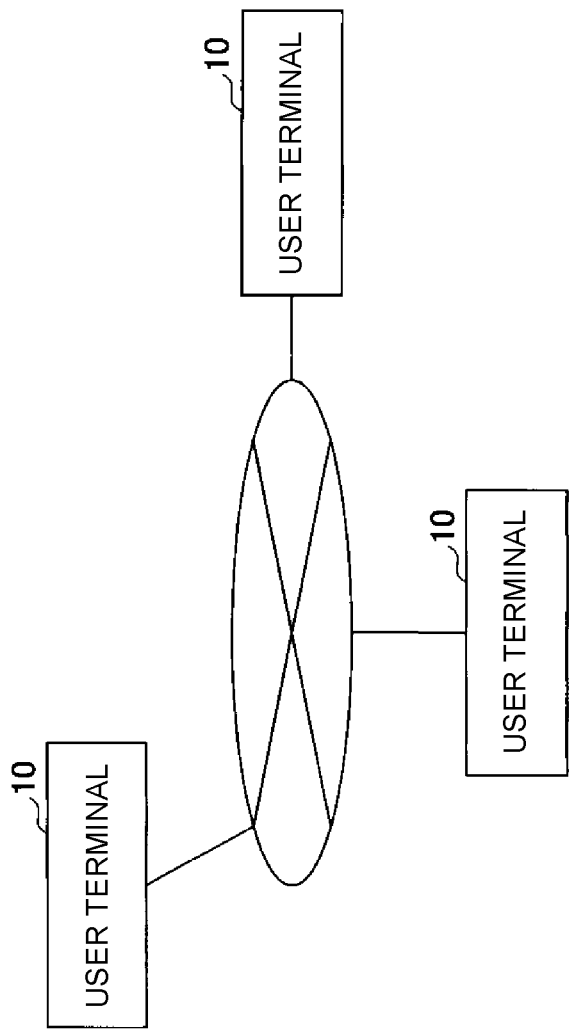
FIG. 1 is a diagram showing a system configuration example according to an embodiment of the present invention.

Hereinafter, an embodiment of the present invention is described based on the drawings. FIG. 1 is a diagram showing a system configuration example according to the embodiment of the present invention. In FIG. 1, a plurality of user terminals 10 (for example, a PC (Personal Computer) or the like) are connected to each other via a LAN (Local Area Network) or a network such as the Internet. In this embodiment, a user of any user terminal 10 is assumed to be a supporter of another user. A supporter means another person different from a user who is a support recipient, and a person who supports action for coping with a problem on security which occurs in the user terminal 10 of the support recipient. The relationship between the support recipient and the supporter may be any of "one-to-one", "one-to-many", "many-to-one", or "many-to-many". In addition, the relationship between the support recipient and the supporter may be hierarchical. That is, there may be a supporter for a supporter of another user.

Figure 2:
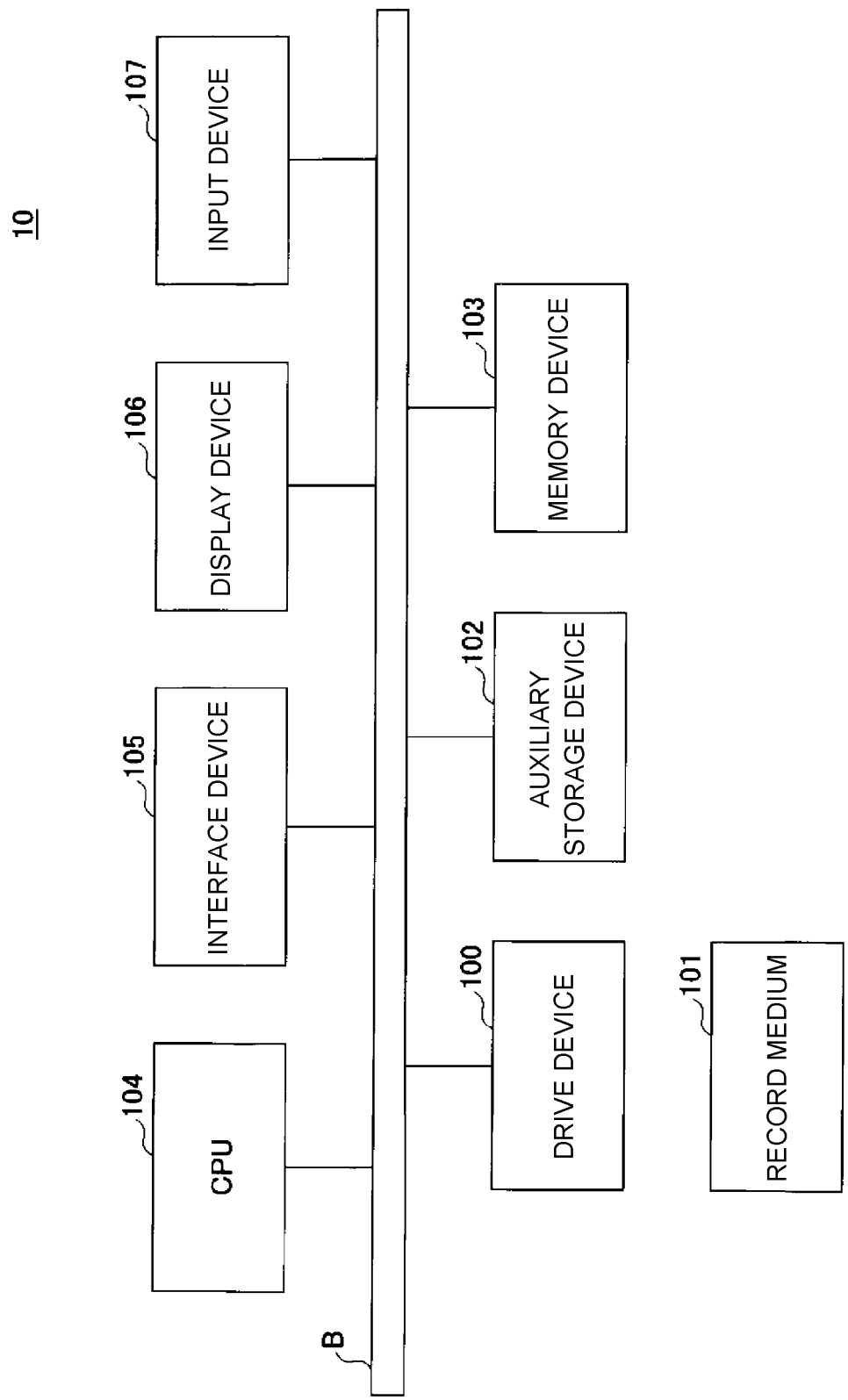
FIG. 2 is a diagram showing a hardware configuration example of a user terminal 10 according to the embodiment of the present invention.

FIG. 2 is a diagram showing a hardware configuration example of the user terminal 10 according to the embodiment of the present invention. The user terminal 10 of FIG. 2 has a drive device 100, an auxiliary storage device 102, a memory device 103, a CPU 104, an interface device 105, a display device 106, an input device 107 and the like, which are connected to each other by a bus B respectively.

A program which implements processing on the user terminal 10 is provided by a record medium 101 such as a CD-ROM. When the record medium 101 storing the program is set in the drive device 100, the program is installed in the auxiliary storage device 102 from the record medium 101 via the drive device 100. However, the program does not necessarily have to be installed from the record medium 101 and may be downloaded from another computer via a network. The auxiliary storage device 102 stores the installed program and also stores necessary files, data or the like.

When the program is instructed to start, the memory device 103 reads out the program from the auxiliary storage device 102 and stores it. The CPU 104 implements functions related to the user terminal 10 according to the program stored in the memory device 103. The interface device 105 is used as an interface for connecting to a network. The display device 106 displays a GUI (Graphical User Interface) or the like by the program. The input device 107 is composed of a keyboard, a mouse and the like, and is used for inputting various operation instructions.

Figure 3:
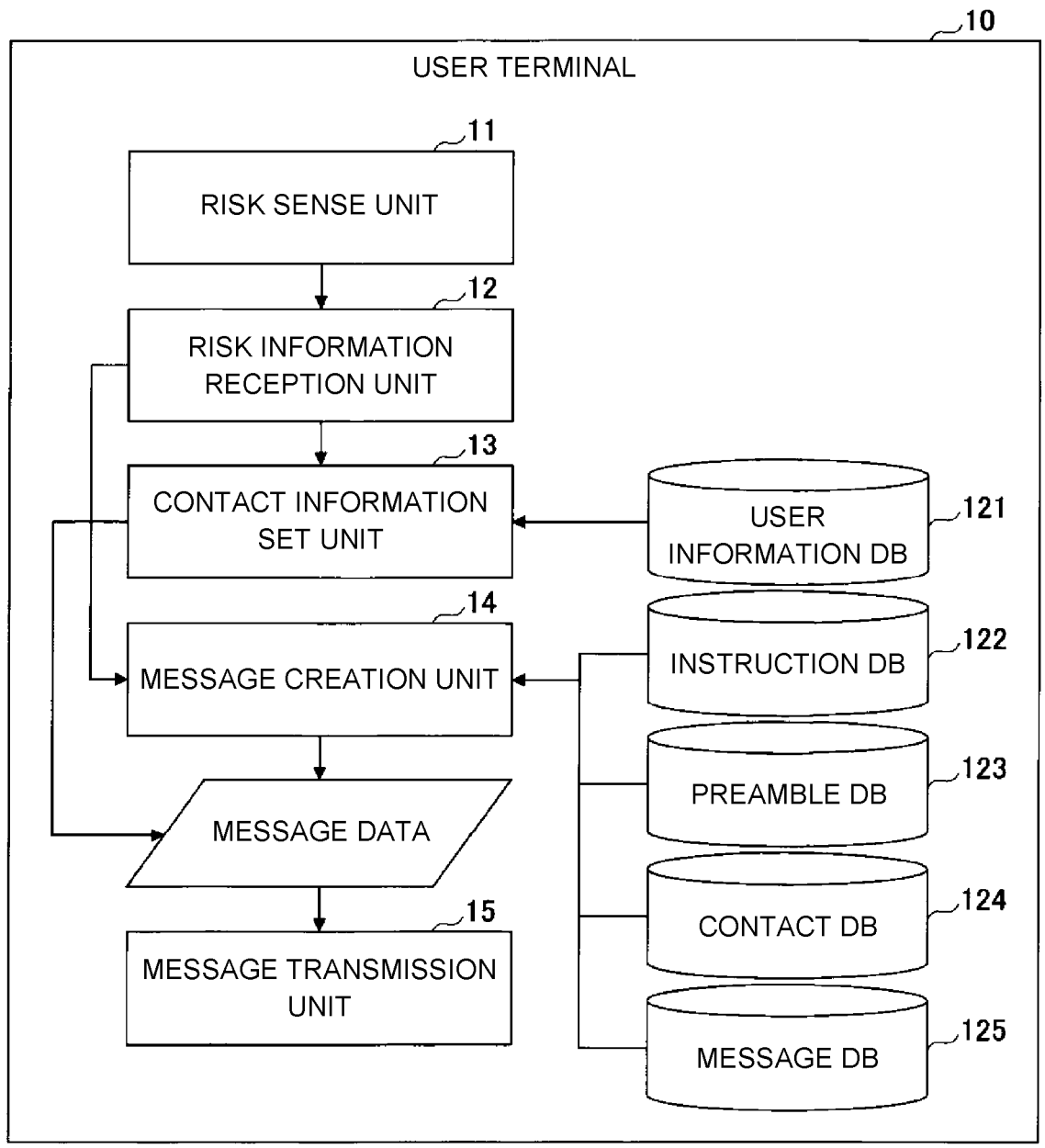
FIG. 3 is a diagram showing a function configuration example of the user terminal 10 according to the embodiment of the present invention.

FIG. 3 is a diagram showing a function configuration example of the user terminal 10 according to the embodiment of the present invention. In FIG. 3, the user terminal 10 has a risk sense unit 11, a risk information reception unit 12, a contact information set unit 13, a message creation unit 14, a message transmission unit 15 and the like. Each of these units is implemented by the processing which one or more programs installed in the user terminal 10 cause the CPU 104 to perform. The user terminal 10 also uses a user information DB 121, an instruction DB 122, a preamble DB 123, a contact DB 124, a message DB 125 and the like. Each of these databases (storage units) can be implemented by using, for example, the auxiliary storage device 102, a storage device connectable to the user terminal 10 via a network, or the like.

The risk sense unit 11 monitors situations of the user terminal 10 to sense (detect) occurrence of a problem on security (hereinafter, simply referred to as "risk") in the user terminal 10. The risk sense unit 11 transmits information indicating contents of the sensed risk (hereinafter, referred to as "risk information") to the risk information reception unit 12.

The risk information reception unit 12 receives the risk information transmitted from the risk sense unit 11. The contact information set unit 13 refers to the user information DB 121 and records, in message data where a message indicating an instruction for coping with the risk indicated by the risk information is recorded, information indicating a contact (output destination) of the message (contact information). The user information DB 121 stores, for each user, a skill level, contacts, contacts of supporters and the like. The skill level means, for example, a level related to skills for coping with risks. For example, a level of skills related to IT (Information Technology) may be considered as the skill level.

The message creation unit 14 refers to the instruction DB 122, the preamble DB 123, the contact DB 124, the message DB 125 and the like to complete the message data. The instruction DB 122 stores, for each type of risks (hereinafter referred to as "risk type"), a list of instructions about actions to take. The preamble DB 123 stores, for each combination of a risk type and a skill level, a preamble of the message. The contact DB 124 stores, for each combination of an instruction and a skill level, a contact (destination) of the message data. The contact mentioned here means a user who is at risk, a supporter of the user, or the like. The message DB 125 stores, for each combination of an instruction and a skill level, a body of the message indicating the instruction.

The message transmission unit 15 transmits (outputs) the message based on the message data created by the message creation unit 14 to the contact recorded in the message data.

Figure 4:
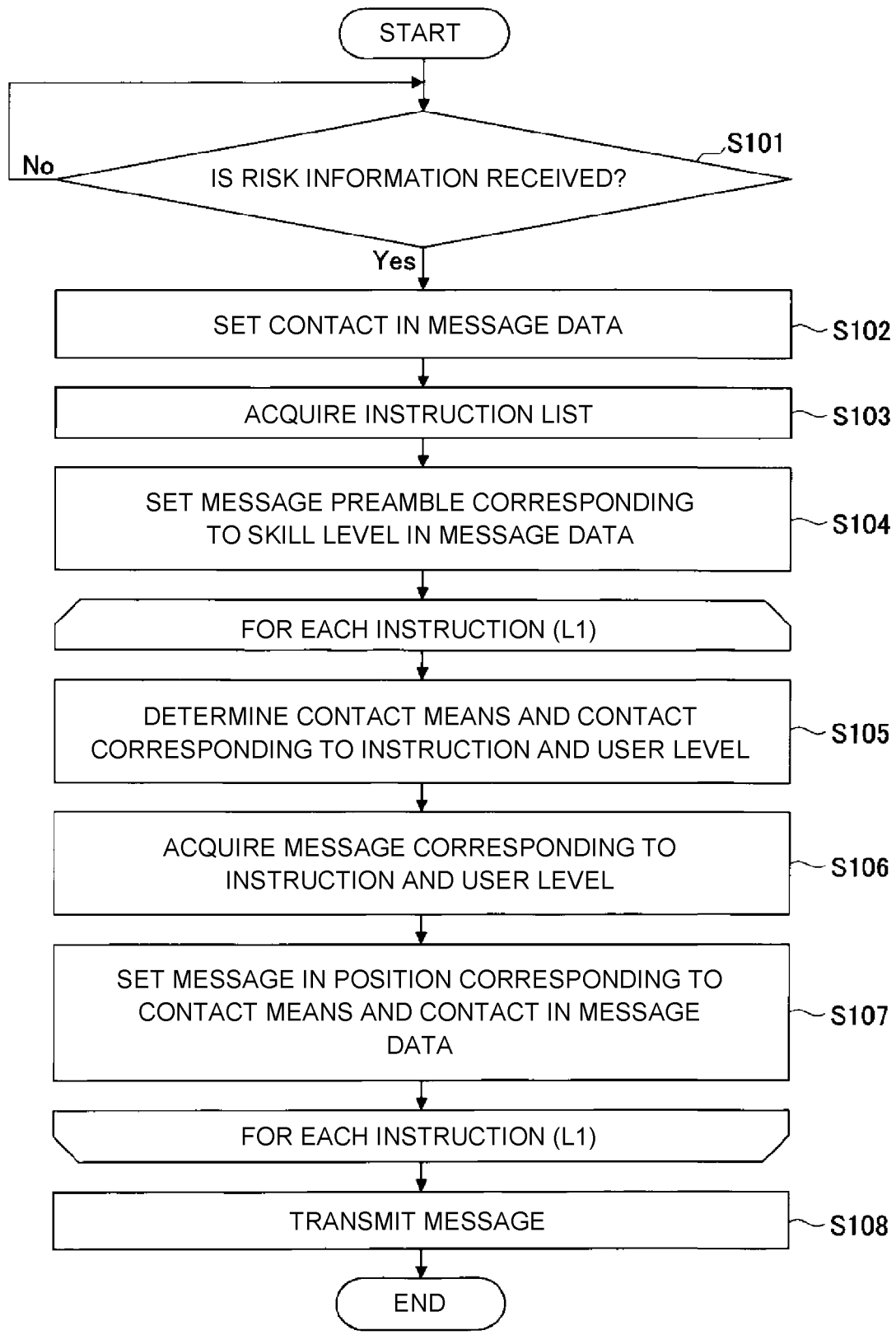
FIG. 4 is a flowchart for describing an example of a processing procedure performed by the user terminal 10.

Hereinafter, a processing procedure performed by the user terminal 10 is described. FIG. 4 is a flowchart for describing an example of the processing procedure performed by the user terminal 10. The processing procedure in FIG. 4 is a processing procedure performed by a certain user terminal 10. The user terminal 10 which is performing the processing procedure in FIG. 4 is hereinafter referred to as "target terminal".

When the risk information reception unit 12 of the target terminal receives risk information transmitted from the risk sense unit 11 which sensed a risk in the target terminal ("Yes" in S101), step S102 and subsequent steps are started.

FIG. 5 is a diagram showing an example of risk information. FIG. 5 shows, for each risk, a risk ID and risk information. In step S101, the risk ID and risk information for any risk are received. Hereinafter, the received risk ID is referred to as "target risk ID" and the received risk information is referred to as "target risk information". The risk information reception unit 12 outputs the target risk information to the message creation unit 14.

The risk information shown in FIG. 5 is an example and other risk information may be defined. For example, in FIG. 5, contents indicated by the risk information are limited to incidents, but risk information in normal times (situations where no security risk or problem occur) may be defined and such risk information may be notified periodically.

In step S102, the contact information set unit 13 of the target terminal generates one message data and sets contact information for the message data.

FIG. 6 is a diagram showing a configuration example of one message data. As shown in FIG. 6, one message data is configured so that for each contact classification, contact information, a message preamble and one or more messages can be recorded. In FIG. 6, the message data in the completed state is shown, but in the message data immediately after generation, only values of the contact classification have been determined. The contact classification means classification of multiple types of contacts for one user. As shown in FIG. 6, in this embodiment, four contact classifications of "user/telephone", "user/e-mail", "supporter/telephone" and "supporter/e-mail" are defined.

"User/telephone" means a contact by telephone for a user of the target terminal (hereinafter referred to as "target user"). "User/e-mail" means a contact by e-mail for the target user. "Supporter/telephone" means a contact by telephone for a supporter of the target user (hereinafter referred to as "target supporter"). "Supporter/e-mail" means a contact by e-mail for the target supporter.

The contact information is an item where a specific value is stored for each contact classification. In step S102, information stored in the user information DB 121 of the target terminal is referred to and a value is set for the item.

FIG. 7 is a diagram showing a configuration example of the user information DB 121. As shown in FIG. 7, the user information DB 121 of the target terminal stores a user ID of the target user, a skill level of the target user, "contact information of the user", "contact information of the supporter" and the like.

In this embodiment, the skill level is evaluated according to five ranks, and the larger a value of the rank is, the higher the skill is. However, the skill level may be evaluated in a way other than five ranks. The skill level may be evaluated by the user himself/herself, or a skill level determination test or the like may be performed and a score thereof may be registered with the user information DB 121. In addition, the skill level may be set for the supporter as well. Each skill level in this embodiment means as follows.

Skill level 5: It is possible to understand and perform most things in person.
Skill level 4: It is possible to understand non-specialized things and perform them in person.
Skill level 3: It is possible to understand commonly used terms and perform simple things in person.
Skill level 2: It is possible to understand simple terms and perform their contents in person.
Skill level 1: It is not possible to perform most things without support from someone else.

"Contact information of the user" means contact information of the target user. "Contact information of the supporter" means contact information of the target supporter. Each of "contact information of the user" and "contact information of the supporter" includes "telephone" and "e-mail". "Telephone" means a telephone number. "E-mail" means an e-mail address. The contact information does not have to be information about telephone or e-mail. For example, other information with which the target user or the target supporter can be contacted, such as an ID of a message chat app, may be set as the contact information. FIG. 7 shows an example where one supporter can be set for one user, but a plurality of supporters may be set.

In step S102, "contact information of the user" and "contact information of the supporter" are recorded in "contact information" of the message data (FIG. 6). The contact information set unit 13 outputs the skill level of the target user to the message creation unit 14.

Subsequently, the message creation unit 14 uses, as an input, a target risk ID output from the risk information reception unit 12, and acquires an instruction list corresponding to the target risk ID from the instruction DB 122 of the target terminal (S103).

FIG. 8 is a diagram showing a configuration example of the instruction DB 122. As shown in FIG. 8, the instruction DB 122 stores, for each risk ID, one or more "instructions" (instructions 1 to 5). However, there are also risks for which there are less than 5 instructions. "Instruction" means information indicating contents of action to perform against a risk. A numerical value following an "instruction" indicates the order of the instruction. That is, the numerical value indicates the order of action to perform. The instructions are an example and are not limited to those shown in FIG. 8.

For example, when the target risk ID is "E" (the user's PC is performing a Dos attack), in FIG. 8, a list of instructions corresponding to the risk ID "E" is acquired as an instruction list. The instruction list is shown in FIG. 9.

Subsequently, the message creation unit 14 uses, as an input, the skill level output from the contact information set unit 13 (hereinafter referred to as "target skill level"), and refers to the preamble DB 123 to set a preamble of the message corresponding to the target risk ID and the target skill level in the message data (S104).

FIG. 10 is a diagram showing a configuration example of the preamble DB 123. As shown in FIG. 10, the preamble DB 123 stores, for each combination of a risk ID and a skill level, a preamble corresponding to the combination. Contents of the preamble has been changed to an expression easy to understand according to the skill level. The preamble shown in FIG. 10 is an example and other preambles may be used.

The message creation unit 14 acquires, in the preamble DB 123, a preamble in a column corresponding to the target skill level among records corresponding to the target risk ID, and sets the preamble in "message preamble" of each contact classification in the message data (FIG. 6). Therefore, the same preamble is set for all contact classifications. However, if the skill level of the supporter is registered with the user information DB 121, the preamble corresponding to a combination of the target risk ID with the skill level of the target supporter may be set in "message preamble" of the contact classification about the supporter.

Subsequently, the message creation unit 14 performs, for each instruction included in the instruction list (FIG. 9), a loop processing L1 including steps S105 to S107. Hereinafter, the instruction which is the n-th processing target in the loop processing L1 is referred to as "instruction n".

In step S105, the message creation unit 14 refers to the contact DB 124 of the target terminal and determines contact means and a contact target person corresponding to the instruction n and the target skill level.

FIG. 11 is a diagram showing a configuration example of the contact DB 124. As shown in FIG. 11, in the contact DB 124, contact means is stored for each instruction, and a contact is stored for each combination of an instruction and a skill level.

The contact means is communication means used for contact, and in this embodiment, it is telephone or e-mail. A contact is a target person of the contact and is a "user" or a "user/supporter". "User" means that only the target user is a contact. "User/supporter" means that both the target user and the target supporter are contacts (that is, the contact includes the target supporter). The contact means may be determined based on urgency of the instruction, and the contact may be determined according to balance between difficulty in performing the instruction and the skill level of the user. The contact means and the contact target person are not limited to those shown in FIG. 11.

In step S105, the message creation unit 14 acquires, in the contact DB 124, contact means of a record corresponding to the instruction n (hereinafter referred to as "target contact means") and a contact in a column corresponding to the target skill level in the record (hereinafter, referred to as "target contact"). By acquiring the contact, the message creation unit 14 determines whether to include the target supporter in the contact of the message about the instruction n.

Subsequently, the message creation unit 14 acquires the message corresponding to the instruction n and the target skill level from the message DB 125 of the target terminal (S106).

FIG. 12 is a diagram showing a configuration example of the message DB 125. As shown in FIG. 12, the message DB 125 stores, for each combination of an instruction and a skill level, a message indicating contents of the instruction. In FIG. 12, each message is represented as text data, but voice data of each message may also be stored for telephone contacts. The messages shown in FIG. 12 are an example and other messages may be used.

In step S106, the message creation unit 14 acquires a message in a column corresponding to the target skill level among records corresponding to the instruction n in the message DB 125. On this occasion, if the target contact means is "telephone", voice data may be acquired.

Subsequently, the message creation unit 14 records (sets) the acquired message in the column of the n-th message, in the row of "contact classification" corresponding to the target contact means and the target contact, in the message data (FIG. 6) (S107).

When the loop processing L1 is performed for all the instructions included in the instruction list (FIG. 9), the message transmission unit 15 transmits (outputs), for each "contact classification" in the message data (FIG. 6), a message preamble and each message set for the contact classification to a destination indicated by contact information of the contact classification using contact means of the contact classification (S108).

FIG. 13 is a diagram for describing an output example of a message. FIG. 13 shows an output example of a message based on the message data in FIG. 6.

In FIG. 13, an item (1) is an output example of a message for the contact classification "user/telephone". In this case, telephone communication is performed to a telephone number set in the "contact information" of the contact classification in the message data, and a message preamble and a message shown in (1) of FIG. 13 ("message 1" in FIG. 6) is output. On this occasion, if the message for the contact classification is voice data, each voice data may be played in order. If the message is text data, voice may be output by voice synthesis based on the text data.

An item (2) is an output example of a message for the contact classification "user/e-mail". In this case, an e-mail including a message preamble and messages shown in (2) of FIG. 13 ("message 2", "message 3" and "message 4" in FIG. 6) is transmitted to an e-mail address set in the "contact information" of the contact classification in the message data.

An item (3) is an output example of a message for the contact classification "supporter/telephone". In this case, in FIG. 6, no message is set for the contact classification. Therefore, the message transmission unit 15 does not transmit a message for the contact classification.

An item (4) is an output example of a message for the contact classification "supporter/e-mail". In this case, an e-mail including a message preamble and messages shown in (4) of FIG. 13 ("message 2", "message 3" and "message 4" in FIG. 6) is transmitted to an e-mail address set in the "contact information" of the contact classification in the message data.

A word "your" may be added to the beginning of the message addressed to the user who is the person concerned, and a word "(user name)'s" may be added to the beginning of the message addressed to the supporter who is another person.

When the message is transmitted by e-mail, contents of the message may not be limited to text data. For example, an image file, an audio file or the like may be attached to the e-mail.

When the skill level of the supporter is low for contents of the instruction, a maintenance service provider or the like may be notified.

An example where the user terminal 10 performs the processing procedure in FIG. 4 has been described above, but a server (one or more computers) connected to each user terminal 10 may perform the processing procedure in FIG. 4. In this case, each user terminal 10 may have the risk sense unit 11, and the server may have the functional units other than the risk sense unit 11 in FIG. 3. When the server performs the processing procedure in FIG. 4, the user information DB 121 may store records (that is, a plurality of records) of each user terminal 10.

As described above, according to this embodiment, when a risk on security occurs, a message according to a skill level of a user is output. For example, a message using simpler expression or expression which makes it easier to understand specific action items is output to a user with low IT skills. As a result, it is possible to facilitate coping with risks on security.

Moreover, in this embodiment, the communication means is changed according to urgency of the instruction, and the supporter is notified only when the action item is difficult for the IT skill level of the user. This makes it possible for the user to personally cope with what the user can do in person and automatically request support from another person only when the user needs the support from the other person. In addition, the supporter is not contacted unnecessarily and is contacted by appropriate means only when support is truly needed.

In this embodiment, the user terminal 10 is an example of an information processing terminal and an instruction output device. The message creation unit 14 is an example of a first acquisition unit, a second acquisition unit and a determination unit. The message transmission unit 15 is an example of an output unit.

The embodiment of the present invention has been described above in detail, but the present invention is not limited to such a specific embodiment, and various variations and alterations are possible within the scope of the spirit of the present invention described in the claims.

REFERENCE SIGNS LIST

10 User terminal
11 Risk sense unit
12 Risk information reception unit
13 Contact information set unit
14 Message creation unit
15 Message transmission unit
100 Drive device
101 Record medium
102 Auxiliary storage device
103 Memory device
104 CPU
105 Interface device
106 Display device
107 Input device
121 User information DB
122 Instruction DB
123 Preamble DB
124 Contact DB
125 Message DB
B Bus

The invention claimed is:

1. An instruction output device comprising:
a first acquirer configured to acquire, in response to input of risk information indicating contents of a risk related to security of an information processing terminal, one or more instructions corresponding to the risk information;
a second acquirer configured to acquire, for each of the instructions acquired by the first acquirer, a message indicating contents of the instruction corresponding to a security-related skill level of a user of the information processing terminal; and
an output generator configured to generate the message acquired by the second acquirer to the user.

2. The instruction output device according to claim 1, further comprising:
a determiner configured to determine contact means for each of the instructions acquired by the first acquirer, wherein the output generator output each of the messages using the contact means determined by the determiner for each of the instructions.

3. The instruction output device according to claim 2, wherein
the determiner determines, for each of the instructions acquired by the first acquirer, whether or not to include another person different from the user in output destinations of the message corresponding to the instruction, according to the skill level, and
the output generator outputs the message whose output destinations include the other person to the other person as well.

4. A computer-implemented method for outputting an instruction, wherein a computer performs
acquiring, by a first acquirer, in response to input of risk information indicating contents of a risk related to security of an information processing terminal, one or more instructions corresponding to the risk information;
acquiring, by a second acquirer, for each of the instructions acquired by the first acquirer, a message indicating contents of the instruction corresponding to a security-related skill level of a user of the information processing terminal; and
outputting, by an output generator, the message acquired by the second acquirer to the user.

5. A computer-readable non-transitory recording medium storing computer-executable program instructions that when executed by a processor cause a computer system to:
acquire, by a first acquirer, in response to input of risk information indicating contents of a risk related to security of an information processing terminal, one or more instructions corresponding to the risk information;
acquire, by a second acquirer, for each of the instructions acquired by the first acquirer, a message indicating contents of the instruction corresponding to a security-related skill level of a user of the information processing terminal; and
output, by an output generator, the message acquired by the second acquirer to the user.

6. The instruction output device according to claim 2, wherein the security-related skill level includes a level related to skills for coping with risks related to security of an information processing terminal.

7. The instruction output device according to claim 2, wherein the security-related skill level is among a plurality of security-related skill levels that are ranked based on capability of a user.

8. The instruction output device according to claim 2, wherein the contact means include one or more of a telephone using a telephone number or an email using an email address.

9. The computer-implemented method according to claim 4, the method further comprising:
determining, by a determiner, contact means for each of the instructions acquired by the first acquirer,
wherein the output generator outputs each of the messages using the contact means determined by the determiner for each of the instructions.

10. The computer-readable non-transitory recording medium of claim 5, the computer-executable program instructions when executed further causing the system to:
determine, by a determiner, contact means for each of the instructions acquired by the first acquirer,
wherein the output generator outputs each of the messages using the contact means determined by the determiner for each of the instructions.

11. The computer-implemented method according to claim 9, wherein
the determiner determines, for each of the instructions acquired by the first acquirer, whether or not to include another person different from the user in output destinations of the message corresponding to the instruction, according to the skill level, and
the output generator outputs the message whose output destinations include the other person to the other person as well.

12. The computer-implemented method according to claim 9, wherein the security-related skill level includes a level related to skills for coping with risks related to security of an information processing terminal.

13. The computer-implemented method according to claim 9, wherein the security-related skill level is among a plurality of security-related skill levels that are ranked based on capability of a user.

14. The computer-implemented method according to claim 9, wherein the contact means include one or more of a telephone using a telephone number or an email using an email address.

15. The computer-readable non-transitory recording medium of claim 10, wherein
the determiner determines, for each of the instructions acquired by the first acquirer, whether or not to include another person different from the user in output destinations of the message corresponding to the instruction, according to the skill level, and
the output generator outputs the message whose output destinations include the other person to the other person as well.

16. The computer-readable non-transitory recording medium of claim 10, wherein the security-related skill level includes a level related to skills for coping with risks related to security of an information processing terminal.

17. The computer-readable non-transitory recording medium of claim 10,
wherein the security-related skill level is among a plurality of security-related skill levels that are ranked based on capability of a user.

18. The computer-readable non-transitory recording medium of claim 10,
wherein the contact means include one or more of a telephone using a telephone number or an email using an email address.

* * * * *